United States Patent [19]

Chan et al.

[11] Patent Number: 4,798,472

[45] Date of Patent: Jan. 17, 1989

[54] EXTRUDER SCREW WITH BALANCED FLIGHTS OF DIFFERENT FUNCTIONAL SECTIONS

[76] Inventors: Harry Chan, 89 Larkin Ave., Markham, Ontario, Canada, L3P 5M6; Basilio Yi, 35 Hoover Dr., Thornhill, Ontario, Canada, L3T 5M6

[21] Appl. No.: 143,745

[22] Filed: Jan. 14, 1988

[51] Int. Cl.⁴ .............................. B01F 7/08; B29B 1/06
[52] U.S. Cl. ........................................ 366/89; 366/323
[58] Field of Search ............... 366/79, 83, 87–90, 366/144–146, 318, 319, 321–323, 342, 343; 425/207–209

[56] References Cited

U.S. PATENT DOCUMENTS

| | | | |
|---|---|---|---|
| Re. 28,901 | 7/1976 | Kim | 425/208 |
| 3,897,938 | 8/1975 | Kim . | |
| 4,405,239 | 9/1983 | Chung et al. | 366/89 |
| 4,472,059 | 9/1984 | Klein et al. | 366/79 |
| 4,729,662 | 3/1988 | O'Brien | 366/89 |
| 4,733,970 | 3/1988 | Yokana | 366/89 |

OTHER PUBLICATIONS

Society of the Plastics Industry, Plastics Engineering Handbook of the Society of Plastic Industry Inc., New York, Van Nostrand Reinhold Co., 1976, p. 161.

*Primary Examiner*—Timothy F. Simone

[57] ABSTRACT

A plasticating extruder with a screw having a feed section, a transition section, a metering section, a first primary flight located substantially in the first two sections, a second primary flight located substantially in the last two sections and two corresponding secondary flights located in the transition section, all the flights in the latter section radially balancing each other, and the first primary flight in the feed section balancing radially the second primary flight in the metering section. In another embodiment, the screw can in addition have a mixing section and another metering section, the latter having a flight balancing radially other flights in other sections.

2 Claims, 1 Drawing Sheet

U.S. Patent  Jan. 17, 1989  4,798,472
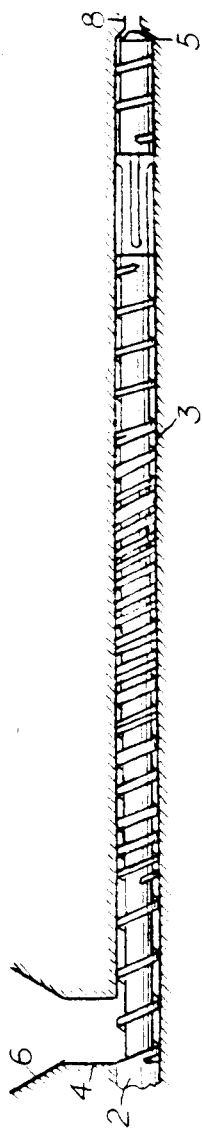
FIG. 1
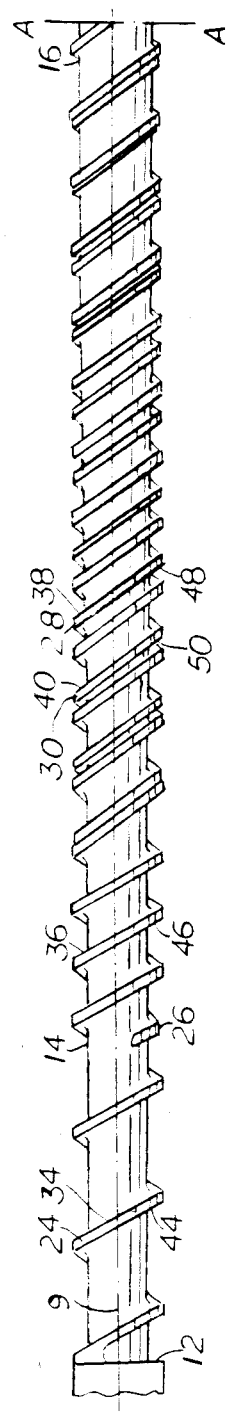
FIG. 2
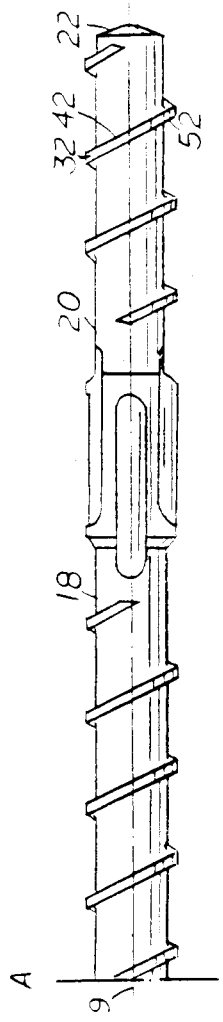

EXTRUDER SCREW WITH BALANCED FLIGHTS OF DIFFERENT FUNCTIONAL SECTIONS

BACKGROUND OF THE INVENTION

This invention relates to plasticating extruders for preparing a plasticated material from solids introduced into the extruder, the latter having a screw placed into an elongate barrel and including the following functional sections; a feed section, a transition section and a metering section in a downstream direction.

More particularly, the present invention relates to extruders with a screw having primary and secondary flights providing high melting performance and extrudate stability. Such extruders are disclosed, for example, in U.S. Pat. Nos. 3,897,938; Re. 28,901; 4,405,239 and 4,472,059, the latter being the closest.

The screw of the last patent has the following flights: two primary flights passing through the transition section and defining channels for continuous conveying the material in the downstream direction as the material is melted within the channels, each said flight having a leading face facing downstream and a trailing face facing upstream, and each said channel extending between the leading and trailing faces, the primary flights in the transition section being opposite one another about a longitudinal axis of the screw such that radial forces conveyed to the material in the channels of the transition section are substantially balanced;

two secondary flights, each of them being associated with one of said primary flights for segregating the already plasticized material from the not-plasticated-yet material in the corresponding channel, the secondary flights being located only in the transition section and being opposite one another about the longitudinal axis such that radial forces conveyed to the material in the transition section are substantially balanced.

As a result of having balanced flights, lateral deflection, wear, vibration and galling of the screw and barrel are substantially reduced.

However, the screw of the last patent has also two flights in the feed section. This decreases the volume available for accepting the raw material, not plasticized yet and, therefore, having density much lower than that of the plasticized material in the downstream sections. That is why the flow of the material in the feed section is reduced, and the screw has thus the lower carrying capacity which is not matched by the subsequent sections.

SUMMARY OF THE INVENTION

The objective of the present invention is to overcome the above drawback of the known extruders, to prevent starving in the downstream sections and to enhance solids conveying in the feed section. This increases the feeding capacity of the extruder, accomodates low bulk density feedstock and allows to process a high percentage of recycled fluff.

The above objective is achieved by the following improvement:

the first primary flight is located only in the feed and transition sections, and the second primary flight is located only in the transition and metering sections, the primary flight being thus spaced apart from one another along the longitudinal axis on a length of substantially one section, and the first primary flight in the feed section and the second primary flight in the metering section being spaced circumferentially apart from one another about the longitudinal axis such that radial forces conveyed to the material in the feed section balance radial forces conveyed to the material in the metering section.

Another distinguishing feature of the present invention is that the screw after the metering section has a mixing section and another metering section in the downstream direction, the screw in the latter section having a flight circumferentially spaced in relation to the primary flight so that the radial forces conveyed to the material in all the sections of the screw are substantially balanced.

The mixing section provides additional homogenization of the melt, the last metering section being also balanced and used to control uniformity of the output rates of the extruder.

It should be mentioned that the technique of adding a mixing section and a metering section are known (Society of the Plastics Industry. Plastics Engineering Handbook of the Society of Plastics Industry, Inc. New York, Van Nostrand Reinhold Co., 1976, p. 161). Actually, the known device is a two-stage extrusion screw with a single flight, both stages having a feed section, a transition section and a metering section. In comparison with the last known screw, the present invention does not have the second feed and transition sections and takes measures to balance the additional sections.

A more complete appreciation of the present invention and the distinguishing characteristics, objective and attendant advantages thereof set out herein are more apparent and obvious to one ordinary skilled in the art from the following detailed description, drawings and appended claims.

BRIEF DESCRIPTION OF THE DRAWINGS

FIG. 1 is a schematic cross-sectional view of the present extruder;

FIG. 2 with sections A—A when longitudinally aligned is a side view of the screw of the present invention.

DESCRIPTION OF THE PREFERRED EMBODIMENTS

Referring now to the drawings wherein like reference characters designate like or corresponding parts throughout the several views, the extruder of the present invention includes a screw 2 placed into an elongate barrel 3 extending axially between an upstream end 4 and a downstream end 5, a hopper 6, an extruder head 8, heating and cooling means (not shown).

The screw 2 is journaled for rotation around its longitudinal axis 9 by a conventional transmission means (not shown) and is divided into the following functional sections:

a feed section from a point 12 to a point 14;
a transition section from a point 14 to a point 16;
a metering section from a point 16 to a point 18;
a mixing section from a point 18 to a point 20;
another metering section from a point 20 to the front end 22 of the screw 2.

Clearly, the mixing (18 and 20) and additional metering (20 and 22) sections are optional. The screw 2 can have either the first three sections (12, 14), 14, 16 and 16, 18), or the first four sections (12, 14, 14, 16, 16, 18 and 18, 20), or all the five sections (12, 14, 14, 16, 16, 18, 18, 20 and 20, 22) as it is shown in the drawings. In the first two cases, the front end 22 should be located appropriately either at the point 18 or 20 (not shown).

The feed section (12 and 14) has a first primary flight 24 starting therein and passing through the transition section (14 and 16) up to the point 16 thereof. The latter section has also a second primary flight 26 starting therein at the point 14 and passing through the metering section (16 and 18) to the end thereof at the point 18.

The transition section (14 and 16) has also two secondary flights 28 and 30 associated accordingly with the primary flights 24 and 26. Herein the flight 24 is opposite to the flight 26, and the flight 28 is opposite to the flight 30 about the longitudinal axis 9 of the screw 2. Also, the part of the flight 24 located in the feed section (12 and 14) and the part of the flight 26 located in the metering section (16 and 18) are not only spaced apart from one another along the axis 9 on a length of substantially one section, but are spaced circumferentially from one another as well.

The mixing section (18 and 20) is of a conventional fluted design (see the above handbook reference) which is often used for extrusion of polyolefins.

The final metering section (20 and 22) has a flight 32 circumferentially spaced apart in relation to the flights 24, 26, 28 and 30 in the upstream sections.

The flights 24, 26, 28, 30 and 32 have accordingly leading faces 34, 36, 38, 40 and 42 facing downstream and trailing faces 44, 46, 48, 50 and 52 facing upstream. The leading and trailing faces form channels between them for conveying the processed material in the downstream direction.

In operation, as the screw 2 is rotated, the feed section (12 and 14) picks up the unplastified material deposited into the hopper 6 and delivers the material in a compacted form to the transition section (14 and 16). Since the latter has only one flight (24), its capacity is higher than that of the subsequent sections with their starving being thus prevented.

The leading faces 34 and 36 of the primary flights 24 and 26 press the material such that the portion of the solid phase material contacting the barrel 3 is melted and directed away from the remaining portion of the solid phase into the channels formed by the secondary flights 28 and 30 associated with the primary flights 24 and 26 in the transition section (14 and 16). The separation of solids from melt decreases the amount of energy required for the complete plastification and improved the quality of the extrudate.

The material exerts lateral pressure deflecting the screw 2 laterally (i.e. transverse to the longitudinal axis 9). Due to the described above circumferential spacing arrangement of the flights 24, 26, 28, 30 and 32, the radial forces are substantially balanced (i.e. they tend to cancel out each other). More particularly, in the feed section (12 and 14) the flight 24 balances the flight 26 in the metering section (16 and 18), or both these flights take into account the flight 32 in the last metering section (20 and 22) if the embodiment has two metering sections. Also, in the transition section (14 and 16) all four flights 24, 26, 28 and 30 balance each other.

It should be mentioned that the illustrated embodiment shows like flights arranged in opposed relationship and symmetrically relative to one another about the longitudinal axis 9. However, numerous non-symmetrical arrangements of the flights balancing each other are possible (not shown).

It is to be understood that the above detailed description is exemplary only. Various modifications may be obviously resorted to by those skilled in the art without departing from the spirit and scope of the present invention as set forth in the appended claims.

We claim:

1. A plasticating extruder for preparing a plasticated material from solids introduced into the extruder, the latter having a screw placed into an elongate barrel, said screw including:

functional sections having a feed section, a transition section and a metering section in a downstream direction;

a longitudinal axis;

a first primary flight and a second primary flight, the primary flights passing through the transition section and defining channels for continuously conveying the material in the downstream direction as the material is melted within the channels, each said flight having a leading face facing downstream and a trailing face facing upstream, and each said channel extending between the leading and trailing faces, the primary flights in the transition section being opposite one another about the longitudinal axis such that radial forces conveyed to the material in the channels of the transition section are substantially balanced;

two secondary flights, each of them being associated with one of said primary flights for segregating the already plasticated material from the solids in the corresponding channel, the secondary flights being located only in the transition section and being opposite one another about the longitudinal axis such that radial forces conveyed to the material in the transition section are substantially balanced;

the improvement wherein the first primary flight is located only in the feed and transition sections, and the second primary flight is located only in the transition and metering sections, the primary flights being thus spaced apart from one another along the longitudinal axis on a length of substantially one section, and the first primary flight in the feed section and the second primary flight in the metering section being spaced circumferentially apart from one another about the longitudinal axis such that radial forces conveyed to the material in the feed section balance radial forces conveyed to the material in the metering section.

2. The extruder of claim 1 wherein the screw after the metering section has a mixing section and another metering section in the downstream direction, the screw in the latter section having a flight circumferentially spaced in relation to the primary flights so that the radial forces conveyed to the material in all the sections of the screw are substantially balanced.

* * * * *